United States Patent [19]

Willi

[11] Patent Number: 5,771,857
[45] Date of Patent: Jun. 30, 1998

[54] DIRECT INJECTED GAS ENGINE WITH VARIABLE GAS PRESSURE CONTROL APPARATUS AND METHOD OF OPERATION

[75] Inventor: Martin L. Willi, Lafayette, Ind.

[73] Assignee: Caterpillar Inc., Peoria, Ill.

[21] Appl. No.: 744,552

[22] Filed: Nov. 6, 1996

[51] Int. Cl.[6] .......................... F02D 41/30; F02M 21/02
[52] U.S. Cl. ........................................ 123/305; 123/486
[58] Field of Search .................................. 123/294, 305, 123/478, 480, 486, 526, 527

[56] References Cited

U.S. PATENT DOCUMENTS

| | | | |
|---|---|---|---|
| 3,949,714 | 4/1976 | Mitchell | 123/458 |
| 4,141,326 | 2/1979 | Wolber | 123/684 |
| 4,260,333 | 4/1981 | Schillinger | 417/45 |
| 4,364,364 | 12/1982 | Subramaniam | 123/527 |
| 4,368,705 | 1/1983 | Stevenson et al. | 123/357 |
| 4,520,763 | 6/1985 | Lynch et al. | 123/527 |
| 4,606,322 | 8/1986 | Reid et al. | 123/575 |
| 4,721,081 | 1/1988 | Krauja et al. | 123/298 |
| 5,033,444 | 7/1991 | Kaufman et al. | 123/527 |
| 5,063,890 | 11/1991 | Hironaka | 123/294 |
| 5,105,791 | 4/1992 | Nye, Jr. | 123/527 |
| 5,117,798 | 6/1992 | Nozaki | 123/527 |
| 5,150,685 | 9/1992 | Porter et al. | 123/478 |
| 5,183,011 | 2/1993 | Fujii et al. | 123/1 A |
| 5,367,999 | 11/1994 | King et al. | 123/458 |
| 5,423,303 | 6/1995 | Bennett | 123/527 |

OTHER PUBLICATIONS

Vestergren, "The Merits of the Gas-Diesel Engine", ICE—vol. 25-3 1995 Fall Technical Conference, vol. 3, ASME 1995, pp. 81-88.

Willi et al., "Design and Development of a Direct Injected Glow Plug Ignition Assisted, Natural Gas Engine", American Society of Mechanical Engineers, ICE-vol. 22, Heavy Duty Engineers, A Look at the Future, Editor Goyal, Book No. 100375-1994 pp. 31-36, published 1994.

Primary Examiner—Andrew M. Dolinar
Attorney, Agent, or Firm—A. J. Hickman

[57] ABSTRACT

A direct injected gas engine system is made more suitable for use with a fuel of natural gas by a fuel control system providing variable gas pressure control to reduce gas pressure compared to that applied at full load, and extend fuel pulse duration for light loads as compared to fuel pulse duration at light loads if applied at the full load gas pressure. The light load fuel pulse duration can now be extended to be at least as long as the ignition delay period of the engine. A variable gas pressure regulator under the control of the engine's electronic control module provides the desired gas pressure control. Engine speed and load parameters are used to monitor engine conditions and provide signals to the electronic control module, which may use them to set the appropriate pressure in a map mode. The apparatus and method of operation improves efficiency and lowers emissions at light loads.

12 Claims, 2 Drawing Sheets

DIRECT INJECTED GAS ENGINE WITH VARIABLE GAS PRESSURE CONTROL APPARATUS AND METHOD OF OPERATION

TECHNICAL FIELD

This invention relates to an internal combustion engine system that uses a gaseous fuel, such as natural gas, that is directly injected into the engine and, more particularly, a fuel system and a method for operating a fuel system for such an engine.

BACKGROUND ART

Natural gas in which the principal constituent is methane, is attractive as a low cost, clean burning alternative to conventional fuels commonly applied to diesel engines. It has been found, however, that engines using natural gas in a conventional Otto cycle, utilizing a premixed fuel and air charge and a spark for combustion initiation, have drawbacks in terms of engine performance relative to an equivalent size diesel fueled engine. Direct injection, where the gaseous fuel is directly injected into a combustion chamber of the engine without premixing with air, offers the potential to match diesel-fueled engine performance while maintaining the smoke-free operating characteristics of a spark ignited gas engine. Additionally, a direct injected gas engine tends to be less sensitive to variations in fuel quality than a spark ignited engine.

The working principle of a gas Otto engine differs from that of a direct injected gas engine. In Otto engines the gas, at a relatively low pressure, is mixed with air prior to the beginning of each compression stroke. After compression, the fuel charge is ignited by a spark, or by a small amount of diesel oil.

In contrast, a direct injected gas engine, sometimes referred to as a gas-diesel engine, does not have the gas injected until the end of the compression stroke. This requires higher pressure gas than is needed for an Otto cycle. However, advantages of direct injection can out-weigh the requirement for higher gas pressure.

In a paper of which the present inventor is co-author, "Design and Development of a Direct Injected, Glow Plug Ignition Assisted, Natural Gas Engine", by Martin L. Willi and Bernard G. Richards, appearing in the American Society of Mechanical Engineers, publication ICE-Vol. 22, *Heavy Duty Engines, A Look at the Future*, Editor: Madan R. Goyal, Book No. 100375–1994, pp. 31–36, (published 1994) there is discussion of the reasons for interest in direct injected natural gas engines, their nature and performance, which paper is herein incorporated by reference as background to the present invention.

The work on which the Willi et al. paper is based established the feasibility of using natural gas in a direct injected engine with performance favorably comparable to that of a similar diesel fueled engine. It is noted in the above-mentioned paper that the direct injected gas engine requires a high pressure gas supply to the engine at a pressure sufficient to overcome cylinder pressure near top dead center (TDC) of the piston in the cylinder. It is also observed in the paper that methane, the major constituent of natural gas, would typically require some kind of ignition assist at usual diesel engine compression ratios due to its low cetane number or high ignition temperature. The article discloses that ignition assist with a hot body, such as a glow plug, was the preferred diesel cycle ignition assist. The Willi et al. paper discloses favorable fuel efficiency is achieved by such an engine, compared to diesel fuel, over a wide range of power levels, but at low power, or light loads, the efficiency of diesel fuel was more favorable.

A further description of gas-diesel engines is contained in a paper by Vestergren, "The Merits of the Gas-Diesel Engine" in a publication identified as ICE-Vol. 25–3, 1995 Fall Technical Conference, Vol. 3, ASME 1995, pp. 81–88, which is herein incorporated by reference as background to the present invention.

The Vestergren paper describes a gas diesel engine for use with a natural gas fuel where pilot diesel fuel injection is used to achieve sufficient temperature for stability in starting combustion. This approach is effective but inherently involves provision of a dual fuel system and the paper does not explain a single fuel system. In prior engine systems using various fuels, it is known to use an electronic control system for monitoring engine conditions and effectively controlling variables such as fuel supply.

For example, King et al. U.S. Pat. No. 5,367,999, Nov. 29, 1994, discloses a gaseous fuel delivery system and method, for a fuel such as natural gas, that maintains variable gaseous fuel pressure in response to signals representing fuel pressure, engine speed, intake manifold pressure, fuel temperature, and fuel composition for improved engine performance. However, the system disclosed is one in which fuel is injected into an intake manifold, and there mixed with air to a substantially homogeneous mixture, rather than one in which a gaseous fuel is injected directly into an engine, without premixing.

Also, in Fujii et al. U.S. Pat. No. 5,183,011, Feb. 2, 1993, is disclosed a hydrogen-fueled engine which includes an electronic control unit receiving a signal related to accelerator pedal position, speed, and coolant temperature. The pressure of the hydrogen supplied is controlled according to the control signals. Hydrogen, a more expensive fuel than natural gas, has more favorable ignition characteristics so its use may result in different systems. For example, the Fujii et al. patent does not disclose use of an ignition assist feature but rather compression ignition and it is also disclosed to inject hydrogen when the compression starts, rather than at top dead center. As a further prior art example of electronic control of a gas fuel, Wolber U.S. Pat. No. 4,141,326, Feb. 27, 1979, discloses a hydrogen fueled engine with an exhaust hydrogen sensor to indicate the quantity of unburned hydrogen in the exhaust. The system electronically controls the fuel delivery based on that reading as well as engine speed and temperature. This patent also has an intake manifold for fuel-air mixing and does not relate to a direct injected gas engine.

The prior art also includes descriptions of direct injected fuel engines where features to assist ignition are used. For example, Krauja et al. U.S. Pat. No. 4,721,081, Jan. 26, 1988, describes a flame incubating and propagating apparatus for a fuel combustion system using a fuel such as 100% methanol or ethanol, which has a cetane number lower than conventional diesel fuel. An injector and a baffle means arrangement are provided with an ignition assist device, such as a glow plug, located to heat the fuel spray. The baffle intercepts and temporarily maintains a preselected portion of fuel from the injector and helps start a localized flame of burning fuel that expands throughout all the injected fuel.

DISCLOSURE OF THE INVENTION

The present invention addresses the circumstance that direct injected gas engines as described above normally require a high gas pressure, such as about 1,000 psi or more, for full load operation, which is adverse to favorable operation at light loads. A high gas pressure is selected to get the fuel into the combustion chamber at near top dead center (TDC) in the position of the piston, under full load conditions. That leads to extremely short injection durations at light loads in accordance with prior art practice. In accordance with the present invention, however injection at light loads is controlled by varying the pressure to a lower level than that required for full load operation and injecting the lower pressure gas over a longer injection duration.

By the invention, improved operation at light loads is achieved while preserving the good performance demonstrated at higher loads. The invention does not require a second fuel for pilot diesel operation at light loads or injector and/or piston hardware modifications, though any such options may be used along with the invention if deemed desirable despite the extra cost and complexity. Another option available that could be used at light loads is to run the engine on less than all its cylinders, thus increasing the load on the remaining cylinders, or running the engine on less than all cycles, similarly avoiding light load problems by increasing the load. The invention does not preclude the use of such an option but is believed to make it unnecessary.

By way of further explanation, a direct injected gas engine may receive a pulse of high pressure fuel at full load that has a duration of about 30 degrees of the crank angle rotation of the engine. Under circumstances in which the same high gas pressure is injected at light loads, as was previously done, it inherently leads to extremely short injection durations. That is a consequence of the lower fuel requirements at light loads. Preferably, as has been formerly done, the fuel system is subject to electronic control that allows injection of a fuel quantity that the engine requires at that time. When the control system reads that only a small amount of fuel is needed for a particular cycle, that is what has been supplied over a smaller portion of the power stroke. Some light loads may have formerly required the high pressure fuel to be injected for a time as short as 2 or 3 degrees of engine rotation, considerably shorter than the ignition delay period. Because there is an ignition delay period of about 10 degrees, the short injection duration causes fuel mixing with air to an overlean condition at light loads which results in high fuel consumption and high hydrocarbon emissions. Formerly, for some light loads, the injection duration could be less than the ignition delay period.

The approach taken by the present invention is to reduce gas pressure at light loads in order to eliminate the problems caused by a short injection duration. The same fuel is delivered in accordance with engine requirements. Injection at lower pressure achieves a lengthening of the duration of a pulse of fuel, controlled by a logic pulse in the case of an electronically controlled injector, in order to ensure combustion at a better fuel air mixture for higher efficiency and lower emissions.

In implementing the invention, the capability of the engine's electronic control module, or ECM, is taken advantage of. The ECM receives signals representing a number of engine parameters. The ECM may, for example, receive signals such as an engine speed signal and a signal representing fuel pressure at the inlet to the injectors. Fuel pressure can be related to engine load conditions by the ECM.

When fuel requirements are relative light, as indicated by signals representing engine parameters that are received by the ECM, a control signal is produced by the ECM to lessen the fuel pressure. In an example embodiment, an electronic control signal from the ECM is applied to a hydraulic or other mechanical control device that effects control of a gas regulator through which gas is supplied from a high pressure supply to injectors in the engine.

BEST MODE FOR CARRYING OUT THE INVENTION

Figure 1:
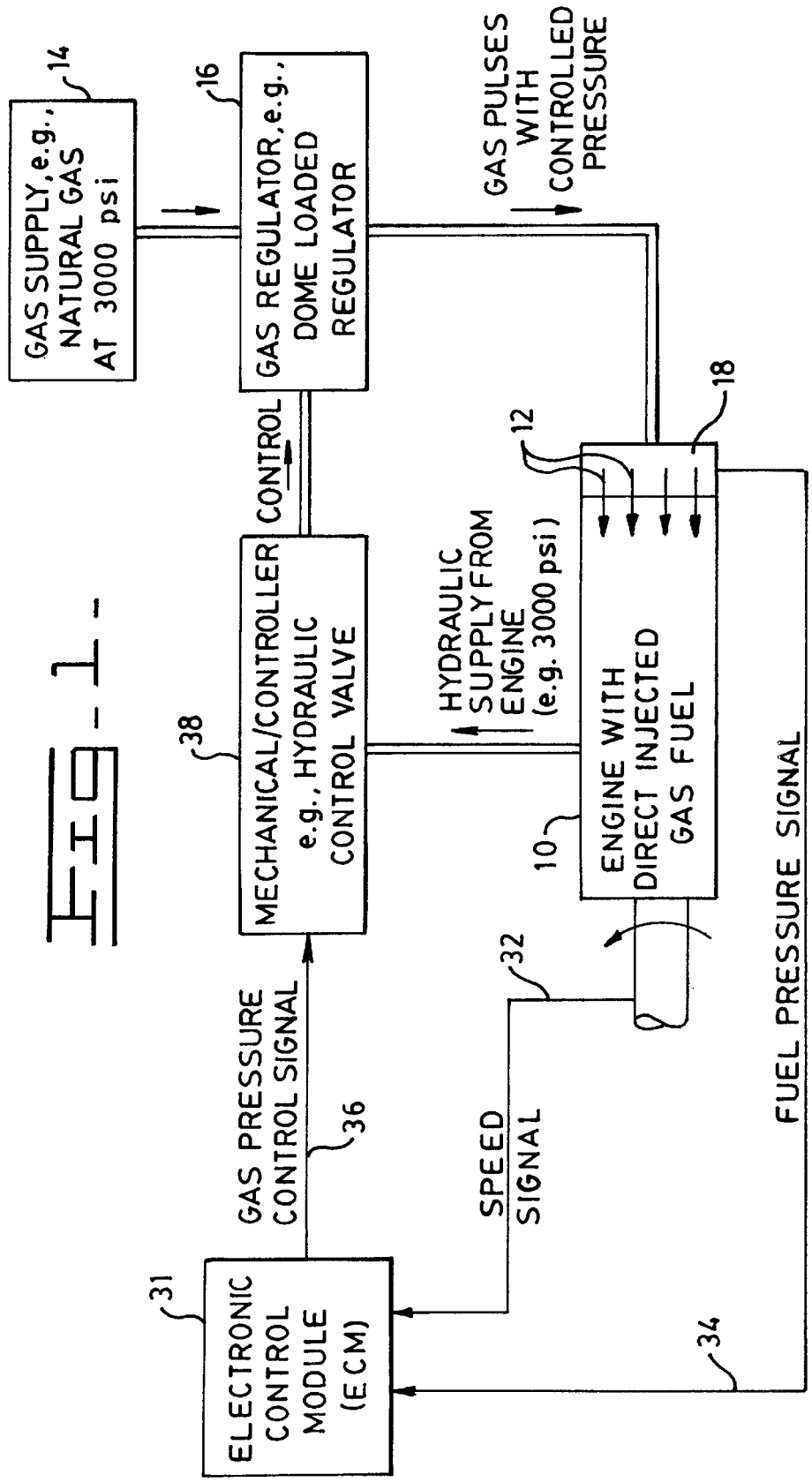
FIG. 1 is a schematic block diagram of an embodiment of the present invention.

Referring to FIG. 1, an engine 10 with direct injected gas fuel is illustrated in relation to its fuel system. The engine has gas injectors 12 to the respective combustion chambers of its plurality of cylinders. Gas is supplied to the injectors from the fuel system including a gas supply 14 that provides gas at a certain high pressure, such as natural gas at about 3,000 pounds per square inch. The arrangement of an injector 12 with a combustion chamber will be further described in the description of FIG. 12, below.

The high gas pressure of the supply 14 can either be provided through gas compression, which may require about 4–10% of the engine's output power depending on the pressure prior to pressurization. Alternatively, pressurization of liquefied natural gas (LNG), and subsequent vaporization, will require less than about 1% of the engine's output power.

While the present invention is in contemplation of the use of natural gas, it is also useful with other gases with similar characteristics, that is, those with a relatively low cetane number that requires ignition assist at typical diesel engine compression ratios. The pressurization of the gas is in accordance with engine requirements so the gas can be supplied to the injectors 12 at a sufficient pressure at full load for the injected gas to overcome cylinder pressure near top dead center. Direct gas injected engines vary in their requirements for maximum gas pressure from about 700 to 5,000 psi. The supply 14, therefore, generally should supply a gas at a pressurization of at least about 1,000 psi.

Prior to injection into the engine, the gas is supplied by supply 14 to a gas regulator 16 that has the capability of controllably varying, and lowering the pressure of the gas from the supply before it reaches the injectors 12. The gas is supplied with controlled pressure to a manifold 18 on the engine prior to entering the injectors 12. The manifold 18 is a gas manifold and not one in which there is mixing of fuel and air. In accordance with the intent of a direct injected engine, the fuel is only mixed with air in the combustion chambers.

The reduction in pressure effected by the regulator 16 is controlled so that at light loads, which require a smaller quantity of fuel to the engine than at higher loads, especially full load, the duration of fuel pulses is extended to a greater part of a power stroke. For example, a light load may require fuel for only about 2° of a power stroke., if the fuel were supplied at the full pressure of supply 14. Such a short pulse causes the ignition problems previously described, in principal part due to the fact a natural gas type of fuel in a typical engine will have an ignition delay period of typically about 10°. That is, it can take about that much of the power stroke before any ignition occurs, during which the already injected fuel is mixed with air in the combustion chamber to an overlean condition. The inefficiency of combustion resulting from the overlean condition is primarily what causes higher fuel consumption and higher emissions. With a controlled fuel pressure there is a longer duration pulse at light loads that can be at least as long as the ignition delay period to ensure efficient combustion.

Figure 2:
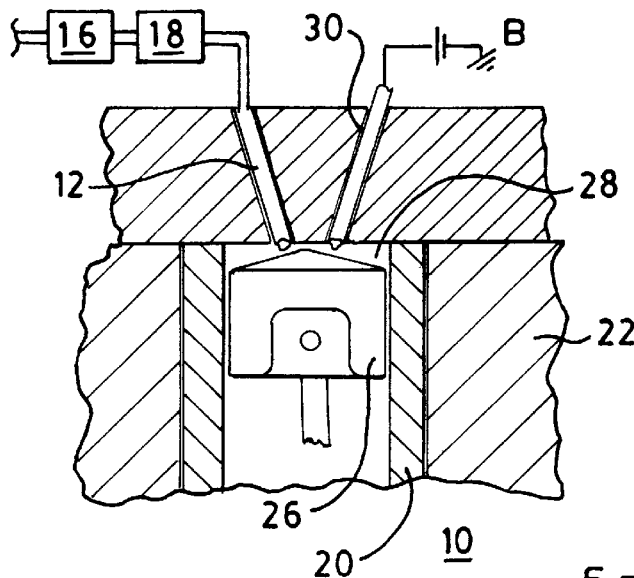
FIG. 2 is a partial simplified cross-sectional view of an engine combustion chamber and related components.

Before proceeding with FIG. 1 for further description of the means and method of controlling the pressure, reference is made to FIG. 2. FIG. 2 shows a portion of engine 10 with part of one cylinder 20, in engine block 22 and having a cylinder head 24. The number of cylinders 20 of engine 10 may be determined in accordance with general practice. In this partial and simplified view, a reciprocating piston 26 is disposed in the cylinder. The piston 26 is illustrated at its top-dead-center (TDC) position, proximate the upper end of cylinder 20.

The shape of the upper surface of the piston 26 leaves a space relative to cylinder head 24 and cylinder 20 to define a combustion chamber 28. It is into combustion chamber 28 that gas fuel is directly injected by one of the injectors 12. It is schematically shown in FIG. 2 that injector 12 receives the gas from the gas regulator 16 and gas manifold 18.

An additional element shown in FIG. 2, and one not shown in FIG. 1, is an ignition assist device 30 that may be a glow plug in accordance with known diesel engine practice. The glow plug 30 comprises a resistance heating element (not shown in detail), located at the end of the glow plug that extends into chamber 28. It is continuously heated such as by a battery B, and provides a hot surface to initiate combustion of the air/fuel mixture. In general, an ignition assist device used as part of the invention is a hot body or surface to act as an ignition site in chamber 28. The energy to provide heat may be derived from any source. Preferably, an ignition assist device used in direct injected gas engines in accordance with the invention is a glow plug, or other durable device, and not a spark plug because of the generally more limited life of spark plugs when used in high pressure applications.

The specific configuration of the glow plug 30 in relation to the injector and the combustion chamber may take various forms. One embodiment is that shown in Krauja et al. U.S. Pat. No. 4,721,081 that includes a baffle around part of the glow plug to intercept and temporarily maintain part of the injected fuel so it remains proximate the glow plug. Said patent is herein incorporated by reference for its description of such arrangements.

Returning to a description of FIG. 1, the fuel control system of the engine 10 includes several elements of significance in achieving a desired pressure variation of gas from regulator 16. An electronic control module 31, or ECM, is shown which, for example, contains a microprocessor that in accordance with known practice can perform electronic signal processing involving logic and programmed computations. The ECM receives signals from the engine relating to various engine parameters including, in this example, an engine speed signal from the engine shaft on line 32 and a fuel pressure signal from the gas manifold 18, at the inlet to the injectors 12, on line 34, sensors, or transducers, for sensing such parameters and providing electrical signals corresponding to them are generally known. The ECM is programmed by generally known techniques to relate the fuel pressure signal to engine load. The load signal, developed from sensed fuel pressure, and the speed signal are utilized by the ECM to determine, by its programmed logic, the desired gas pressure for the engine 10 under the particular speed and load conditions prevailing.

The ECM may be of the same general character as previously used control units utilizing a microprocessor that can be programmed for performing control functions that satisfy predetermined conditions. An example of an engine control system using a control unit having a microprocessor is described in U.S. Pat. No. 4,368,705, by Stevenson et al., issued Jan. 18, 1983, which is incorporated herein by reference for its general description of the nature and operation of such systems.

An electrical gas pressure control signal resulting from the processing by the ECM is applied on line 36 to a mechanical controller 37, Controller 38 is, in this example, a hydraulic control valve that in turn hydraulically controls the gas regulator 16. The hydraulic control valve 38 receives its hydraulic supply from the engine at a pressure of, for example, 3,000 psi. The mechanical controller 38 is connected with the gas regulator 16 to adjust the regulator to a pressure determined by the gas pressure control signal from the electronic control module. The electrical-hydraulic fuel control system illustrated is one example of a variety that may be employed to carry out the invention.

The mechanical controller 38 may be a control valve referred to as the rail pressure control valve as is typically present in engine systems. The gas regulator 16, in accordance with this invention, is preferably a dome loaded regulator which is a known and readily available type of regulator that avoids regulator droop.

With further reference to FIGS. 1 and 2, there is a direct injected gas engine 10 with a fuel control system comprising regulator 16 and control valve 38 which is under the control of an electrical control system comprising the ECM working on selected input signals from the engine to provide a gas pressure control signal to the valve. The ECM, valve 38, regulator 16 and their interrelated elements serve as a means for variably controlling the pressure of gas delivered to the combustion chambers 28 of the engine 10 through injectors 12, which gas is provided to the regulator 16 at an initial, high pressure from a means for supplying fuel to the engine comprising the gas supply 14.

The electrical and mechanical control elements of the fuel control system serve to adjust the pressure of applied fuel so that a pulse of fuel at a light load extends for a longer duration than if the same quantity of fuel were applied to the injectors at full pressure. That is, when the control system reduces the gas pressure from of the original, high gas pressure, the duration of the fuel pulse is extended relative to the fuel pulse duration that would obtain at the full load gas pressure.

The fuel control system can be readily arranged to operate in a map mode, generally similar to operation in accordance with timing maps presently used on diesel engines. In general the map mode control will be programmed into the ECM and will result in a maximum gas pressure to the injectors when the speed and load on the engine are both at maximum values, a minimum pressure when the speed and load are both at minimum values, and an intermediate value of gas pressure, subject to whatever variation is programmed into the ECM, when either the speed or load have other values.

In addition to the apparatus described above, the invention includes innovative methods of operating a direct injected gas engine that comprise providing a gaseous fuel at an initial pressure, such as from supply 14, that meets maximum engine requirements at full load; monitoring engine parameters, such as by speed and fuel pressure sensors, to detect when the engine 10 is operating at less than full load; controlling pressure of gas pulses injected into the engine during respective combustion cycles, e.g., by regulator 16 subjected to control by controller 38 and the ECM, including lowering the pressure and thereby extending the duration of pulses when the monitoring indicates the engine is operating at less than full load so that a substantially equivalent quantity of gas is injected meeting engine load requirements as compared to that delivered at the initial pressure; and injecting the controlled gas pulses directly into an engine combustion chamber 28 during respective combustion cycles. In other aspects of the method of the invention, the controlling of gas pulses is performed in map mode interrelating engine conditions and gas pressure in accordance with a map as described above. Another aspect is that the controlling of pulses at light loads, less than full load, is such as to extend the pulses to a duration at least as long as the ignition delay period of the combustion process.

INDUSTRIAL APPLICABILITY

Figure 3:
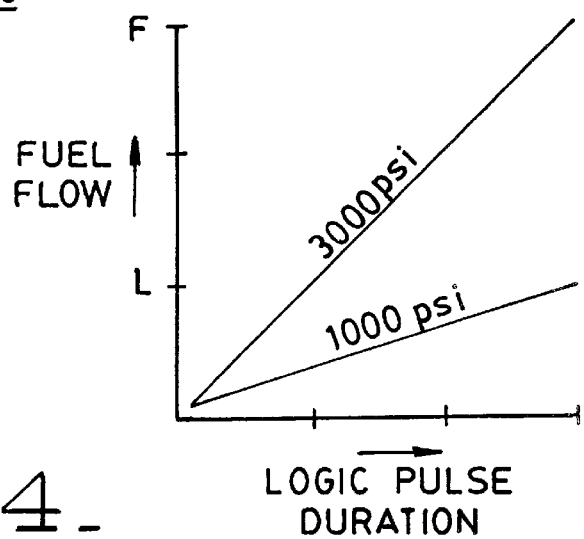
FIG. 3 is a graph relating fuel flow to logic pulse duration for different gas pressures.
Figure 4:
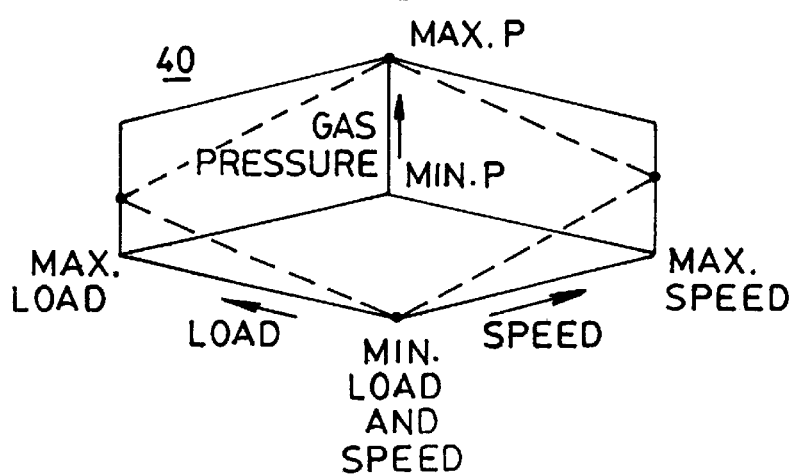
FIG. 4 is a map relating engine load, speed and gas pressure in accordance with an example of the present invention.

A further understanding of the manner in which the present invention operates can be obtained by reference to FIGS. 3 and 4.

In FIG. 3, there is illustrated a graph relating fuel flow and on the vertical axis, logic pulse duration, on the horizontal axis, for different pressure gases. FIG. 3 is not represented as an exact portrayal of values for a specific engine but rather shows relative values. Taking the example referred to in FIG. 1 where the gas supply is at a pressure of 3,000 psi, it can be seen from FIG. 3 that if gas is applied at 3,000 psi and if the fuel flow required for full load conditions equals three of the arbitrary units on the vertical axis, level "F", that the logic pulse duration of injection of the fuel would be three of the arbitrary units illustrated on the horizontal axis. If at certain light load conditions the engine required fuel flow equal to only one arbitrary unit on the vertical axis, level "L", and if the gas were still delivered or injected at 3,000 psi, it can be seen that about one unit on the horizontal axis would be the pulse duration. However, if, practicing the present invention, the gas pressure is lowered to 1,000 psi, the same amount of fuel would be delivered only after about three of the arbitrary units on the horizontal axis thus allowing more efficient combustion and the other benefits described above. Generally, the slope of a line representing fuel flow at a given pressure, less than maximum pressure, will be less by the same proportion as the pressures, i.e., by about one-third in this example. The pulse duration is multiplied by that same factor, i.e., about three in this example.

In the graph of FIG. 3, a gap between the graph lines and the zero point at the axes intersection is due to the inherent delay of about 400 microseconds required for injector operation at minimum load.

The illustrative example of FIG. 3 assumes the existence of choked flow throughout operation at both the maximum pressure and lower pressure. Choked flow means there is a minimum pressure ratio of about two to one between the inlet and outlet of the injector orifices. Variations of that gas pressure ratio, as may occur particularly at low pressure, will change the exact arithmetic relation of gas pressure and pulse duration but the basic point of extending the pulse duration at lower gas pressure by the present invention still applies.

Referring now to FIG. 4, there is illustrated a map 40 to further illustrate the operation of the system. This generally illustrates the programming of the electronic control module to determine the appropriate gas pressure for given load and speed conditions. In this three-dimensional representation, gas pressure on a vertical axis is related with speed and load measures on two orthogonal horizontal axes. Maximum gas pressure is the result when both speed and load are at maximum values, gas pressure is at a minimum when both speed and load are at a minimum. When either or both of the speed and load signals are intermediate, their minimum and maximum, the gas pressure has an intermediate value. For a given intermediate speed, and a given intermediate load there is a pressure of intermediate value to be derived.

Gas pressure maps for performing the present invention may be developed in the same general manner as timing maps for engine operation. An appropriate gas pressure control map may have nonlinear and nonplanar variations unlike the simplified example of FIG. 4.

By adjusting the pressure of the fuel applied to the gas injectors of a direct injected gas engine, the fuel can be combusted more efficiently because the duration of injected gas pulses at light loads is extended and the ignition delay period is therefore not as significant a factor. This allows use of fuels, such as natural gas, with a cetane number lower than a mentioned diesel fuel, and, particularly, with an ignition assist device, such as a glow plug, presents the ability to match or exceed diesel fuel performance over a wider range of loads, including light loads. This is attained independently of a dual fuel system, engine or injector hardware modifications, or operation on less than all cylinders or less than all cycles.

It will be recognized that the invention may take various other forms than those specifically described herein and that other aspects, objects and advantages of this invention can be obtained from a study of the drawings, the disclosure and the appended claims.

What is claimed is:

1. A fuel system of a direct injected gas engine comprising:

a source of pressurized gaseous fuel containing natural gas pressurized to at least about 1,000 psi;

an injector arranged to inject fuel directly into a combustion chamber of an engine;

a fuel control system controlling pressure of fuel supplied to the injector from the source, said fuel control system being responsive to engine load conditions to reduce the pressure of the fuel at light loads, compared to the pressure of the fuel at full load, and to increase the duration of pulses of the fuel at light loads, compared to the duration of pulses to supply a substantially equivalent quantity of gas at the full load gas pressure, wherein the fuel control system comprises a dome loaded gas pressure regulator and an electronic control module, said electronic control module being arranged to receive input signals relating to engine parameters and to provide output signals, to a control valve controlling a fluid of a hydraulic control loop, that determine the pressure of pulses of fuel supplied to the injector by the regulator.

2. The fuel system of claim 1 wherein:

the fuel control system is arranged to exercise control of fuel pulses in a map mode in which engine speed and engine load are interrelated with fuel pressure.

3. The fuel system of claim 1 wherein:

the engine combustion chamber into which the injector is arranged to inject fuel also contains an ignition assist device.

4. The fuel system of claim 3 wherein:

the ignition assist device comprises a glow plug.

5. The fuel system of claim 1 wherein:

the engine combustion chamber is located at the top of a piston in a cylinder; and the fuel control system causes pulses of fuel to be initiated by the injector at approximately the piston's top-dead-center position during both full and low load conditions of the engine.

6. A variable gas pressure control system of a direct injected gas engine comprising:

means for supplying a quantity of a gas fuel to a direct injected gas engine;

means for variably controlling the pressure of the gas supplied to the engine and thereby variably controlling time periods during which the gas is supplied in pulses;

means for electronic signal processing that receives signals related to engine operating conditions and generates signals that determine the gas pressure and time duration of gas pulses produced by the means for variably controlling so that gas pulses at light engine load conditions have longer duration and lower pressure than gas pulses at full load, wherein the signals received by the means for electronic signal processing include a signal related to engine speed and a signal related to fuel pressure at an inlet to the gas injector to the combustion chamber from which the means for electronic signal processing generates a gas pressure control signal substantially in accordance with a gas pressure control map relating gas pressure to engine speed and engine load wherein gas pressure is at a maximum at maximum engine speed and maximum engine load, gas pressure is at a minimum at minimum engine speed and minimum engine load, and gas pressure has intermediate levels between minimum and maximum engine loads and between minimum and maximum engine speeds.

7. A variable gas pressure control system in accordance with claim 6 wherein:

the means for electronic signal processing generates signals to the means for variably controlling the pressure so that the logic pulse duration of a gas pulse having a reduced pressure equal to maximum gas pressure divided by a factor X, is extended to a duration approximately X times the logic pulse duration of an equivalent quantity of gas delivered at maximum gas pressure, where a choked flow of gas occurs at both the maximum gas pressure and the reduced pressure.

8. A variable gas pressure control system in accordance with claim 6 wherein:

the gas fuel supplied by the means for supplying comprises natural gas whose principal constituent is methane, and said gas is maintained under an original pressure, before being subject to the means for variable controlling, of at least about 1,000 psi; and said gas, after being subject to the means for variable controlling, is injected into a combustion chamber of the engine in which a means for ignition is contained.

9. A variable gas pressure control system in accordance with claim 6 wherein:

the means for variable controlling comprises a dome loaded regulator under the control of a mechanical control valve responsive to signals generated by the means for electronic signal processing.

10. A method of operating a fuel system of a direct injected gas engine comprising:

providing a gaseous fuel at an initial pressure that meets maximum engine requirements at full load;

monitoring engine parameters to detect when the engine is operating at less than fuel at an initial pressure that meets maximum engine requirements at full load;

monitoring engine parameters to detect when the engine is operating at less than full load;

controlling pulse duration and gas pressure of gas pulses injected into the engine during respective combustion cycles including extending the duration and lowering the pressure of pulses when the monitoring indicates the engine is operating at less than full load so that a substantially equivalent quantity of gas is injected meeting engine load requirements as compared to that delivered at the initial pressure whereby pulses of fuel at light loads are extended to a duration at least as long as a characteristic ignition delay period of the engine; and injecting the controlled gas pulses directly into an engine combustion chamber, without premixing with air, during respective combustion cycles, said injecting being initiated when the combustion chamber is under approximate maximum compression.

11. The method of claim 10 wherein:

the gas is natural gas comprising methane provided at an initial pressure of at least about 1,000 psi; and the engine combustion chamber into which the gas is injected contains an ignition device.

12. A method of operating a fuel system of a direct injected gas engine, having a combustion chamber containing an ignition device, comprising:

providing a gaseous fuel, that is a natural gas comprising methane, at an initial pressure of at least about 1,000 psi that meets maximum engine requirements at full load;

monitoring engine parameters, including engine speed and pressure of fuel injected into the engine and developing a signal representing engine load, to detect when the engine is operating at less than full load;

controlling pulse duration and gas pressure of gas pulses injected into the engine combustion chamber during respective combustion cycles including extending the duration and lowering the pressure of pulses when the monitoring indicates the engine is operating at less than full load so that a substantially equivalent quantity of gas is injected meeting engine load requirements as compared to that delivered at the initial pressure, such controlling of gas pulses being performed substantially in accordance with a gas control map relating gas pressure to engine speed and to engine load wherein gas pressure is (a) at a maximum at maximum engine speed and maximum engine load, (b) at a minimum at minimum engine speed and minimum engine load, and (c) gas pressure has intermediate levels between minimum and maximum engine speeds and between minimum and maximum engine loads; and injecting the controlled gas pulses directly into the engine combustion chamber, without premixing with air, during respective combustion cycles.

* * * * *